(12) United States Patent
Tsorng et al.

(10) Patent No.: US 11,862,886 B2
(45) Date of Patent: Jan. 2, 2024

(54) CONNECTOR CLIP

(71) Applicant: Quanta Computer Inc., Taoyuan (TW)

(72) Inventors: Yaw-Tzorng Tsorng, Taoyuan (TW);
Chen-Chien Kuo, Taoyuan (TW);
Tang-Shun-Lee Chen, Taoyuan (TW);
Chin-Yu Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 45 days.

(21) Appl. No.: 17/678,783

(22) Filed: Feb. 23, 2022

(65) Prior Publication Data

US 2023/0231334 A1 Jul. 20, 2023

Related U.S. Application Data

(60) Provisional application No. 63/299,782, filed on Jan. 14, 2022.

(51) Int. Cl.
*H01R 13/422* (2006.01)
*H01R 13/447* (2006.01)
*H01R 13/50* (2006.01)

(52) U.S. Cl.
CPC ......... *H01R 13/422* (2013.01); *H01R 13/447* (2013.01); *H01R 13/501* (2013.01)

(58) Field of Classification Search
CPC ... H01R 13/422; H01R 13/447; H01R 13/501
See application file for complete search history.

(56) References Cited

U.S. PATENT DOCUMENTS

| 6,297,447 | B1 | 10/2001 | Burnett et al. |
| 7,044,772 | B2 * | 5/2006 | McCreery ............ H01R 12/675 |
| | | | 439/493 |
| 7,364,458 | B1 * | 4/2008 | Ju ...................... H01R 13/2414 |
| | | | 439/931 |

(Continued)

FOREIGN PATENT DOCUMENTS

| CN | 104785680 A | 7/2015 |
| CN | 213717234 U | 7/2021 |

OTHER PUBLICATIONS

TW Office Action for Application No. 111116206, dated Nov. 10, 2022, w/ First Office Action Summary.

(Continued)

*Primary Examiner* — Travis S Chambers
(74) *Attorney, Agent, or Firm* — NIXON PEABODY LLP

(57) ABSTRACT

A connector clip is disclosed. The connector clip includes a base, a cover, a hinge coupling the cover and the base, and a fastener. The base has a first base side joined to a second base side via a connecting base side. The cover has a first cover side joined to a second cover side via a connecting cover side. The fastener holds the first base side and the first cover side in a fixed position when the connector clip is in a closed configuration in which the connecting base side is parallel to the connecting cover side. An internal cable opening is formed in part by the connecting base side and the connecting cover side when the connector clip is in the closed configuration. The connector clip secures a cable passing through the internal cable opening and connected to a board in its place in the closed configuration.

20 Claims, 11 Drawing Sheets

(56) References Cited

U.S. PATENT DOCUMENTS

| | | | |
|---|---|---|---|
| 8,221,152 B2* | 7/2012 | Tracy | H01R 13/5829 439/371 |
| 10,283,950 B2* | 5/2019 | Gintz | H02G 3/32 |
| 10,790,608 B2* | 9/2020 | Blyahman | H01R 12/772 |
| 2004/0147147 A1* | 7/2004 | Griepentrog | H01R 13/447 439/131 |
| 2009/0121679 A1* | 5/2009 | Thomas | H01R 13/6658 320/137 |

OTHER PUBLICATIONS

TW Search Report for Application No. 111116206, dated Nov. 10, 2022, w/ First Office Action.

* cited by examiner

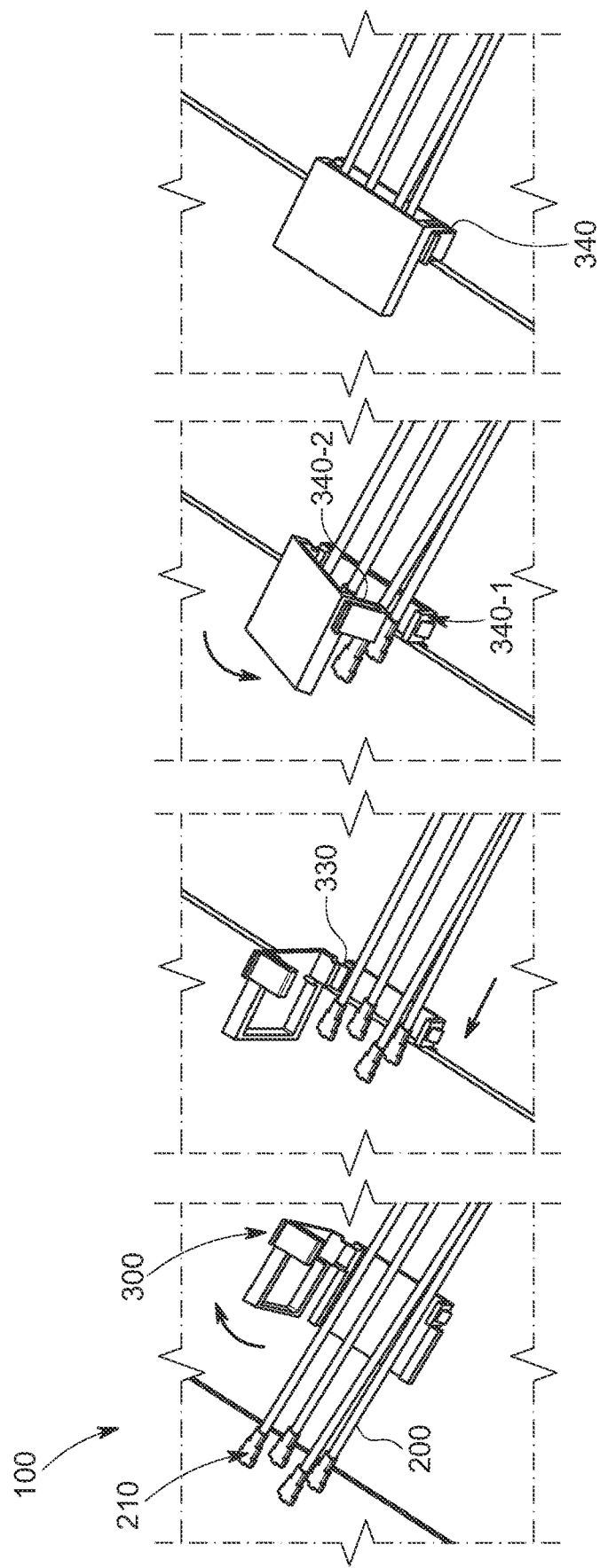

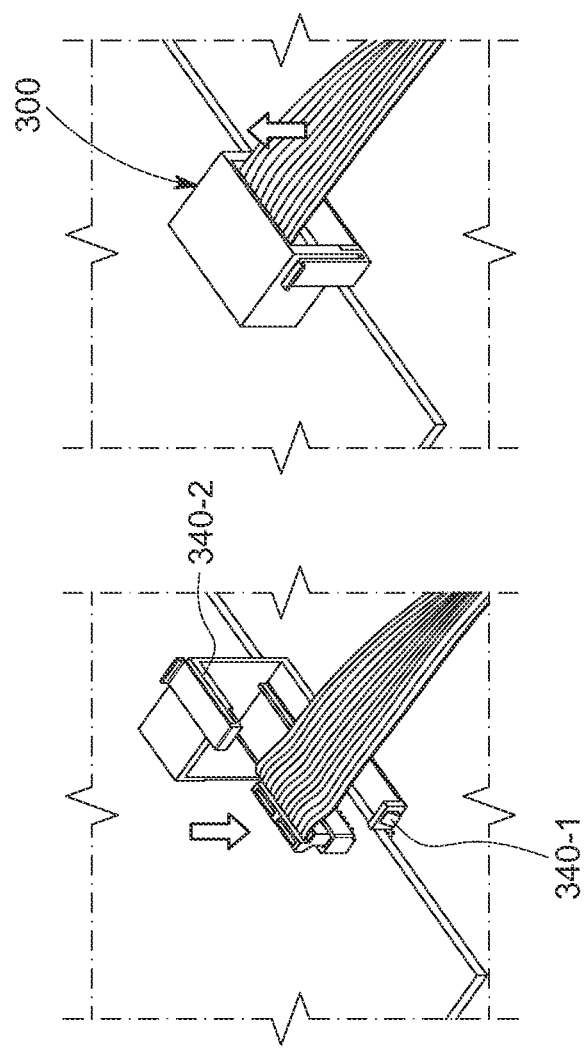
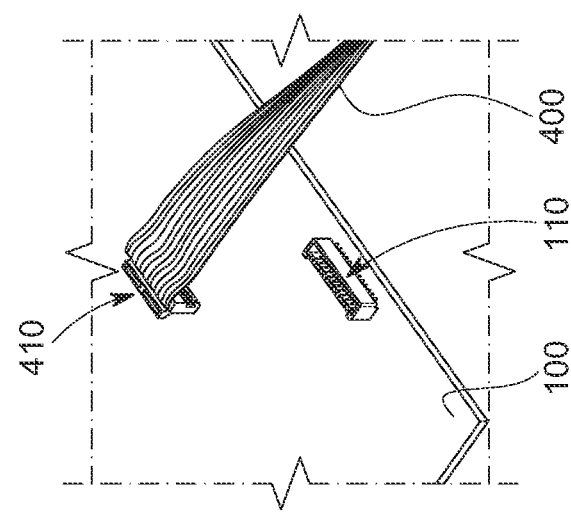
FIG. 11

CONNECTOR CLIP

CROSS-REFERENCE TO RELATED APPLICATIONS

This application claims priority from and benefit of U.S. Provisional Patent Application Ser. No. 63/299,782, filed on Jan. 14, 2022, titled "Board Edge Micro-RF Connector Clip," which is hereby incorporated by reference herein in its entirety.

FIELD OF THE INVENTION

The present invention relates generally to a connector clip, and more specifically, to a connector clip configured to be coupled to an edge of a board assembly and hold cables connected to the board assembly to prevent disengagement of the connected cables from the board assembly.

BACKGROUND OF THE INVENTION

Telecommunication devices, such as 5G equipment, base stations for cellular networks and servers, typically have compartments for holding various components such as a Printed Circuit Board Assembly (PCBA) 100. A number of cables, such as micro-RF/coaxial cables 200, are coupled to the PCBA 100, as shown in FIG. 1. In general, a plug or connector 210 is coupled to a distal end portion of the cable 200 to form a micro-RF cable assembly 200, 210. The plug or connector 210 is coupled to a connector interface, such as a receptacle 110, formed on the PCBA 100, as shown in FIG. 1. In general, the plug or connector 210 and the matching receptacle 110 are shaped and configured to be mated.

Even if the cable 200 is connected to the PCBA 100 via the plug or connector 210 that is coupled with the on board receptacle 110, they are still prone to accidental uncoupling or disengagement. For example, when the cable 200 is pulled away from the PCBA 100 or receptacle 110, the plug or connector 210 may be uncoupled from the receptacle because the plug is usually detachably coupled to the receptacle. However, there is no securing mechanism to prevent disengagement of the plug or connector 210 from the receptacle 110. As an example, FIG. 1 shows three cables 200 coupled to the PCBA 100 via the plugs or connectors 210 detachably coupled to their respective receptacles 110 formed on the board of the PCBA. Further, FIG. 1 also shows a cable 200 uncoupled from the PCBA 100 by disengagement of the plug or connector 210 from the receptacle 110.

Therefore, a need exists for a mechanism or device that prevents accidental uncoupling of cables from compartments of various telecommunication/computing devices. The present disclosure is directed to a connector clip that prevents such uncoupling by holding cables securely in place.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a connector clip is disclosed. The connector clip prevents disengagement of cables connected to a board of an assembly/apparatus when the connector clip is coupled to the board. In various embodiments of the present disclosure, the connector clip includes a base having a first base side joined to a second base side via a connecting base side, the first and second base sides extending from opposing ends of the connecting base side. The connector clip further includes a cover having a first cover side joined to a second cover side via a connecting cover side. The first and second cover sides extend from opposing ends of the connecting cover side. The cover is movable relative to the base between a closed configuration and an open configuration. The cover and the base form an internal cable opening in the closed configuration, the internal cable opening being formed in part by the connecting base side and the connecting cover side. The connector clip further includes a hinge coupling the base and the cover, the hinge being bendable between the open and closed configurations. The connecting base side is parallel to the connecting cover side in the closed configuration, and the connecting base side is non-parallel to the connecting cover side in the open configuration. The connector clip further includes a fastener configured to hold the first base side and the first cover side in a fixed position when the connector clip is in the closed configuration.

In some examples, the connector clip is produced by a single-cavity, either in a single-cavity mold or a multi-cavity mold. In other examples, the connector clip is produced by other suitable methods. In some examples, the connector clip is made of a plastic injection molding material, although the connector clip may be made of any other suitable materials. In some examples, the plastic injection molding material includes acrylic (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), or thermoplastic polyurethane (TPU) among others.

In some examples, the fastener includes a latch and a hook although it is not limited thereto. In some examples, the latch is formed at the first base side and the hook is formed at the first cover side; or the latch is formed at the first cover side and the hook is formed at the first base side. The latch and hook are engaged with each other in the closed configuration, and the latch and hook are disengaged from each other to be in the open configuration.

In some examples, the second cover side is coupled to the second base side via the hinge. The first cover side and the first base side form a first side of the connector clip. The second cover side and the second base side form a second side of the connector clip. The first side and second side of the connector clip are parallel.

In some examples, a first open space is formed at the first side of the connector clip between the first base side and the first cover side in the closed configuration. Further, a second open space is formed at the second side of the connector clip between the second base side and the second cover side in the closed configuration. A height of the first open space and a height of the second open space are same.

In some examples, a third open space is formed between a third base side of the base and a third cover side of the cover extending from an end of the connecting cover side. Further, the third base side and the third cover side form a third side of the connector clip. The internal cable opening is formed at a fourth side of the connector clip being parallel to the third side of the connector clip. The fourth side comprises a fourth base side of the base and a fourth cover side of the cover. The third and fourth sides of the connector clip are perpendicular to the first and second sides of the connector clip.

In some examples, the hinge is formed at the second side of the connector clip near the fourth side of the connector clip. Further, the fastener is formed at the first side of the connector clip near the fourth side of the connector clip, facing the hinge. Furthermore, the hinge and the fastener are located closer to the fourth side than to the third side of the connector clip. A width of the first open space and a width of the second open space are same.

In some examples, a height of the internal cable opening is greater than a height of the third open space that is same as the heights of the first open space and second open space. In some examples, the connector clip further includes a front stopper formed at the third cover side. In some examples, the connector clip further includes a first side stopper formed at the first cover side and a second side stopper formed at the second cover side.

In some examples, in the closed configuration, the connector clip is configured to be connected to a board of a Printed Circuit Board Assembly (PCBA) via the first, second, and third open spaces, the fastener and hinge contacting an edge of the board when the connector clip is connected to the board. Further, the connector clip is configured to hold at least one cable passing through the internal cable opening and coupled to at least one receptacle formed on the board via a plug or connector. The plug or connector is formed at a distal end of the at least one cable. The front stopper is configured to constrain movement of the connector clip in a first direction that is parallel to the first and second sides of the connector clip. Further, the first and second side stoppers are configured to constrain movement of the connector clip in a second direction that is perpendicular to the first direction. Furthermore, the cover placed on top of the plug or connector coupled to the at least one receptacle is configured to constrain movement of the connector clip in a third direction that is perpendicular to both first and second directions.

In some examples, the fastener and hinge are configured to prevent disengagement of the plug or connector from the at least one receptacle that are coupled horizontally or in the first direction; and/or the cover is further configured to prevent disengagement of the plug or connector from the at least one receptacle that are coupled vertically or in the third direction.

In some examples, an outer surface of at least one of the cover or the base is coated with a conductive material, or a thin metal is added to the outer surface to shield electromagnetic interference (EMI) around a contact point. The contact point is where a plug or connector attached to a distal end of the cable is coupled to a receptacle formed on a board of a Printed Circuit Board Assembly (PCBA).

According to certain aspects of the present disclosure, a connector clip configured to be connected to a board of a Printed Circuit Board Assembly (PCBA) is disclosed. The connector clip includes a base, a cover, and a latch. The cover is coupled to the base via a bendable hinge, the cover being movable relative to the base between an open configuration and a closed configuration. The cover and the base form an internal cable opening in the closed configuration. The latch is configured to hold the base and the cover fixed to each in the closed configuration, the latch releasing the cover in the open configuration. A cable is inserted through the internal cable opening of the connector clip, the cable having a plug at a distal end, the plug being configured for engagement to the PCBA. When the connector clip is connected to the board, the plug is prevented from disengagement in the closed configuration, and the plug is in a condition for disengagement in the open configuration.

In some examples, at least a portion of one side of the board is inserted into a space formed between the base and the cover such that the connector clip is removably connected to the board. In some examples, the latch and the hinge contact the side of the board when the connector clip is connected to the board.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 2A shows the connector clip in an open configuration, FIG. 2B shows a foldable cover of the connector clip, and FIG. 2C shows the connector clip in a closed configuration.

FIGS. 3A, 3B, 3C, and 3D show how to connect a connector clip to a side of a PCBA and how to place and hold cables in the connector clip, according to certain aspects of the present disclosure.

FIGS. 9-11 show how various types of connector clips are used for different types of receptacles and their matching cable plugs/connectors that are coupled horizontally or vertically, according to certain aspects of the present disclosure.

Figure 1:
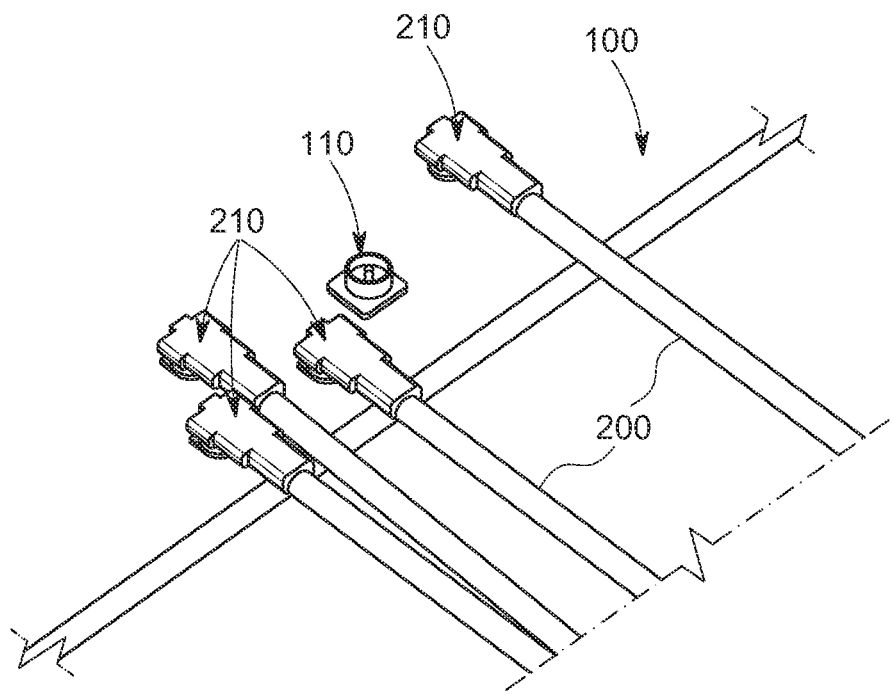
FIG. 1 shows cable assemblies coupled to/uncoupled from a PCBA.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure relates to a connector clip with a base and a cover. The connector clip is connectable to a board of an assembly such as Printed Circuit Board Assembly (PCBA) to prevent accidental disengagement of cables connected to the board. When the connector clip is in a closed configuration, the cables are prevented from being disconnected from the board. The cover can be easily open to be in an open configuration to allow easy disengagement of the cables from the board. Thus, the connector clip can be used easily as a mechanism to secure connection of the cables to the board.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figures 2A, 2B, 2C:
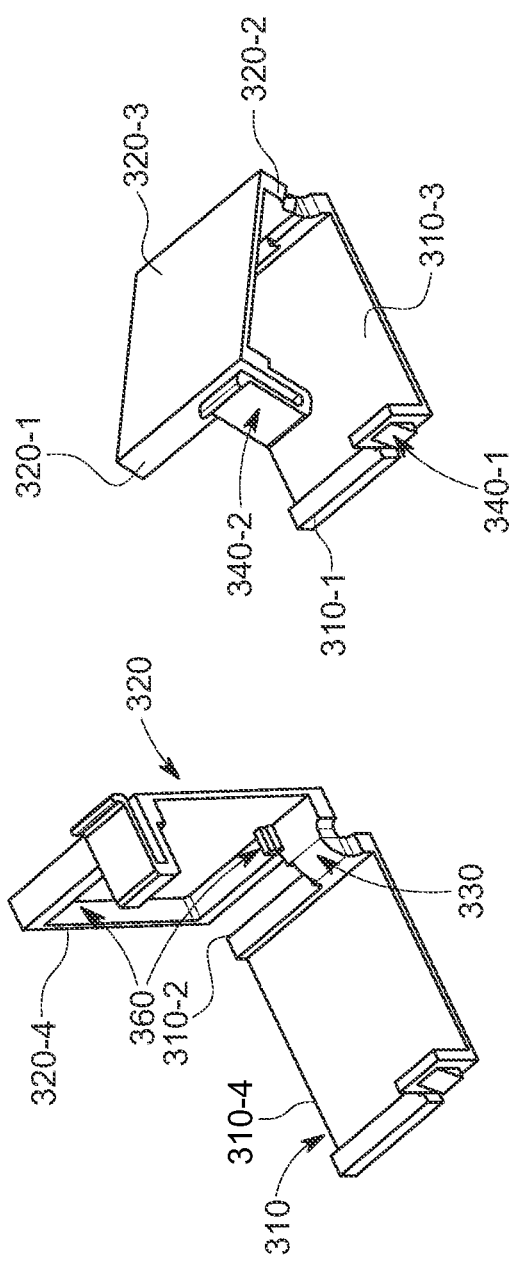
FIGS. 2A, 2B, and 2C are generally perspective views of a connector clip, according to certain aspects of the present disclosure.

Referring to FIGS. 2A, 2B, and 2C, a connector clip 300, according to various embodiments of the present disclosure, has a base 310, a cover 320, a hinge 330, and a fastener 340. The base 310 has a first base side 310-1 joined to a second base side 310-2 via a connecting base side 310-3. The first and second base sides 310-1, 310-2 extend from opposing ends of the connecting base side 310-3. The cover 320 has a first cover side 320-1 joined to a second cover side 320-2 via a connecting cover side 320-3. The first and second cover sides 320-1, 320-2 extend from opposing ends of the connecting cover side 320-3. The cover 320 is movable relative to the base 310 between a closed configuration (FIG. 2C) and an open configuration (FIGS. 2A and 2B). The cover 320 and the base 310 form an internal cable opening 350 in the closed configuration, the internal cable opening being formed in part by the connecting base side 310-3 and the connecting cover side 320-3. The hinge 330 couples the base 310 and the cover 320. The hinge 330 is bendable between the open configuration and the closed configuration. In the closed configuration, the connecting base side is parallel to the connecting cover side, as shown in FIG. 2(c). In the open configuration, the connecting base side is non-parallel to the connecting cover side, as shown in FIGS. 2A and 2B. The fastener 340 is configured to hold the first base side 310-1 and the first cover side 320-1 in a fixed position when the connector clip is in the closed configuration. The first base side 310-1 and the first cover side 320-1 form a first side of the connector clip 300. The internal cable opening 350, which is formed when the connector clip 300 is in the closed configuration, holds a cable 200.

According to various embodiments of the present invention, the connector clip 300 is produced by a single-cavity, although the production method is not limited thereto. According to various embodiments, the connector clip 300 is made of a plastic injection molding material, although the material is not limited thereto. For example, the plastic injection molding material includes acrylic (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), or thermoplastic polyurethane (TPU) among others.

Referring to FIGS. 2A, 2B, and 2C, according to various embodiments of the present disclosure, the fastener 340 includes a latch 340-1 and a hook 340-2. In various embodiments, the latch 340-1 is formed at the first base side 310-1, and the hook 340-2 is formed at the first cover side 320-1. Alternatively, in some embodiments, the latch is formed at the first cover side, and the hook is formed at the first base side. The latch 340-1 and hook 340-2 are engaged with each other in the closed configuration, as shown in FIG. 2C. While the latch 340-1 and hook 340-2 are not engaged with each other, the cover 320 is foldable toward the base 310 via the bendable hinge 330, as shown in FIG. 2B. The latch 340-1 and hook 340-2 of the connector clip 300 in the closed configuration (shown in FIG. 2C) are disengaged from each other to be in the open configuration, as shown in FIGS. 2A and 2B. In some embodiments, a fastener or locking mechanism that is different from the exemplary fastener 340 shown in FIGS. 2A, 2B, and 2C may be employed in the connector clip 300.

As shown in FIGS. 2A, 2B, and 2C, a second cover side 320-2 is coupled to a second base side 310-2 via the hinge 330. The second cover side 320-2 and the second base side 310-2 form a second side of the connector clip 300. The second cover side 320-2 is parallel to the first cover side 320-1, and the second base side 310-2 is parallel to the first base side 310-1 such that the first side and second side of the connector clip 300 are parallel.

Referring to FIG. 2C, a first open space is formed at the first side of the connector clip 300 between the first base side 310-1 and the first cover side 320-1 in the closed configuration. A second open space is formed at the second side of the connector clip 300 between the second base side 310-2 and the second cover side 320-2 in the closed configuration. In the closed configuration, a height of the first open space and a height of the second open space are the same. Further, in the closed configuration, a third open space is formed between a third base side 310-4 of the base 310 and a third cover side 320-4 of the cover 320 forming a third side of the connector clip 300. Furthermore, in the closed configuration, the internal cable opening 350 is formed at a fourth side of the connector clip 300 that is parallel to the third side of the connector clip. The third and fourth sides of the connector clip 300 are perpendicular to the first and second sides of the connector clip.

Referring to FIGS. 2A, 2B, and 2C and FIGS. 3A, 3B, 3C, and 3D, in some embodiments, the hinge 330 is formed at the second side of the connector clip 300 near the fourth side of the connector clip. In some embodiments, the fastener 340 is formed at the first side of the connector clip 300 near the fourth side of the connector clip, facing the hinge 330. In various embodiments, the hinge 330 and the fastener 340 are located closer to the fourth side than to the third side of the connector clip 300. However, positions of the hinge 330 and the fastener 340 are not limited thereto, and the hinge and fastener may be formed at other locations of the connector clip 300. For the connector clip 300 in the closed configuration, a width of the first open space and a width of the second open space are the same. In some embodiments, a height of the internal cable opening 350 formed at the fourth side of the connector clip 300 is greater than a height of the third open space that is same as the heights of the first open space and second open space that are formed at first and second sides, respectively, of the connector clip.

Figure 5:
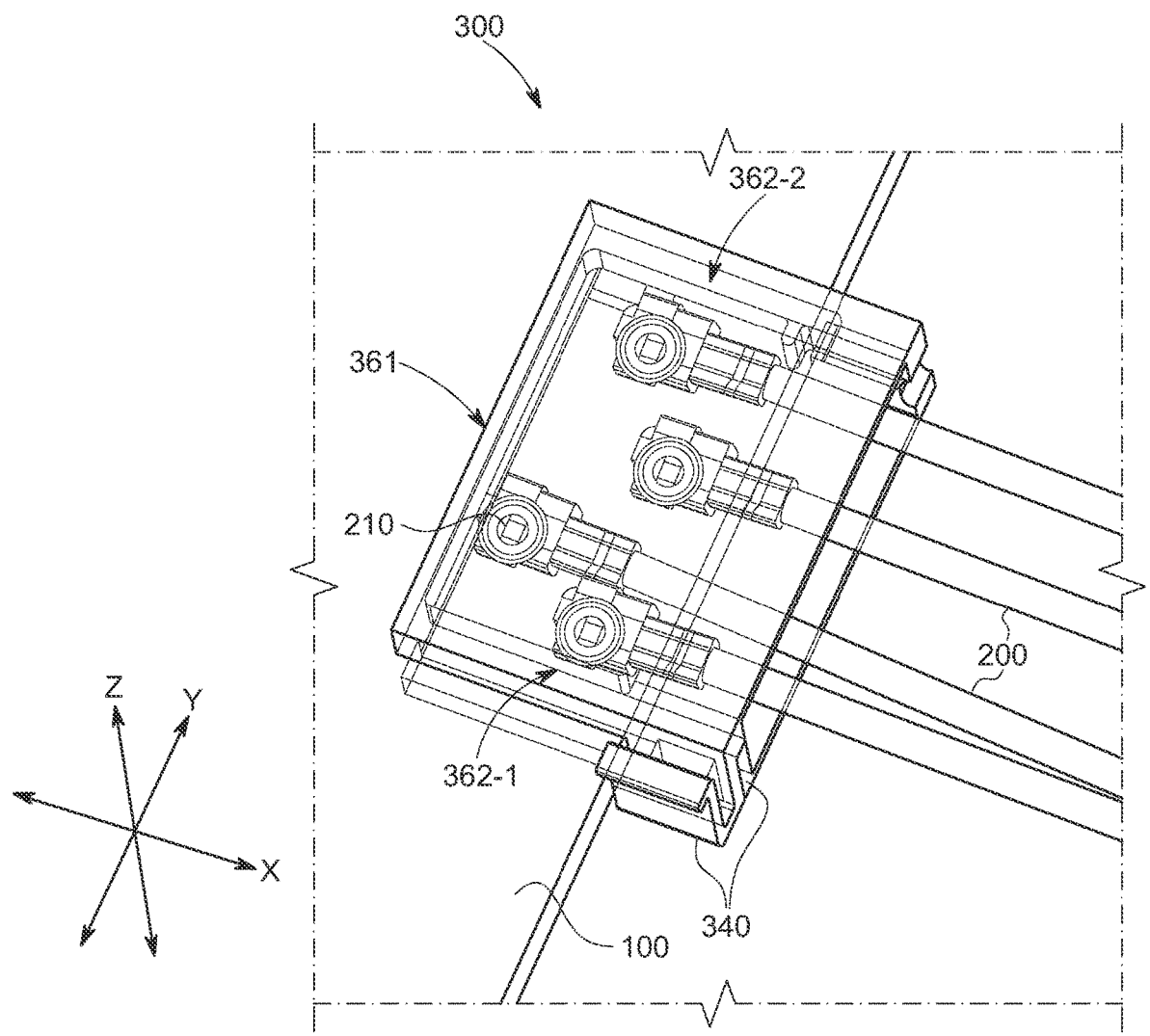
FIG. 5 shows stoppers of a connector clip, according to certain aspects of the present disclosure.
Figure 6:
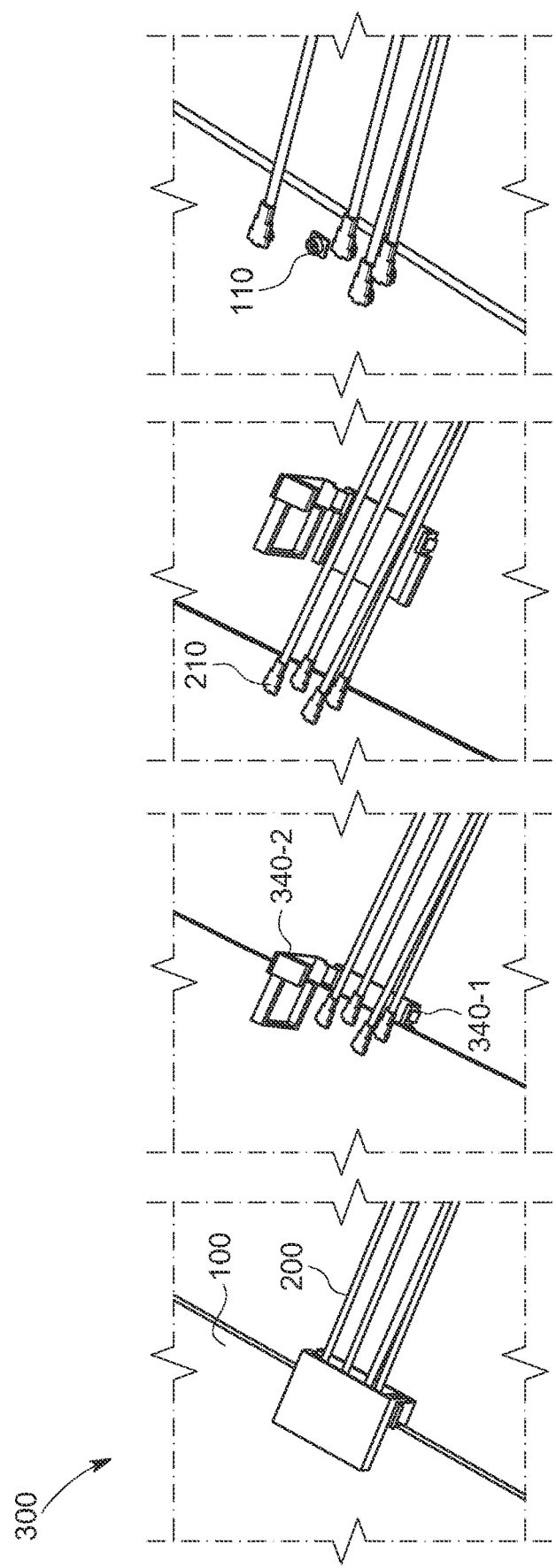
FIGS. 6A, 6B, 6C, and 6D show a mechanism of how a connector clip is disconnected from a side of a PCBA to disengage a cable assembly from a receptacle of the PCBA, according to certain aspects of the present disclosure.

Referring to FIG. 2A and FIG. 5, the connector clip 300 further includes at least one stopper 360. For example, a front stopper 361 is formed at the third cover side 320-4. In some embodiments, the connector clip 300 further includes a first side stopper 362-1 formed at the first side of the cover 320 and a second side stopper 362-2 formed at the second side of the cover.

Referring to FIGS. 3A, 3B, 3C, and 3D, according to various embodiments of the present invention, a method for securing cables 200 connected to a Printed Circuit Board Assembly (PCBA) 100 includes placing the connector clip 300 that is in the open configuration near at least one cable connected to the PCBA, as shown in FIG. 3A. In this state, when the connector clip 300 is closed to be in the closed configuration, the at least one cable 200 is held by the connector clip. The method further includes placing the connector clip 300 in the open configuration to contact a side of a board of the PCBA 100. At least one receptacle 110 is formed on the board, and the connector clip 300 is brought to a side of the board while the at least one cable 200 is coupled to the at least one receptacle. Eventually, at least a portion of the fastener 340 and hinge 330 of the connector clip 300 contacts an edge of the side of the board, as shown in FIG. 3B.

Figure 8:
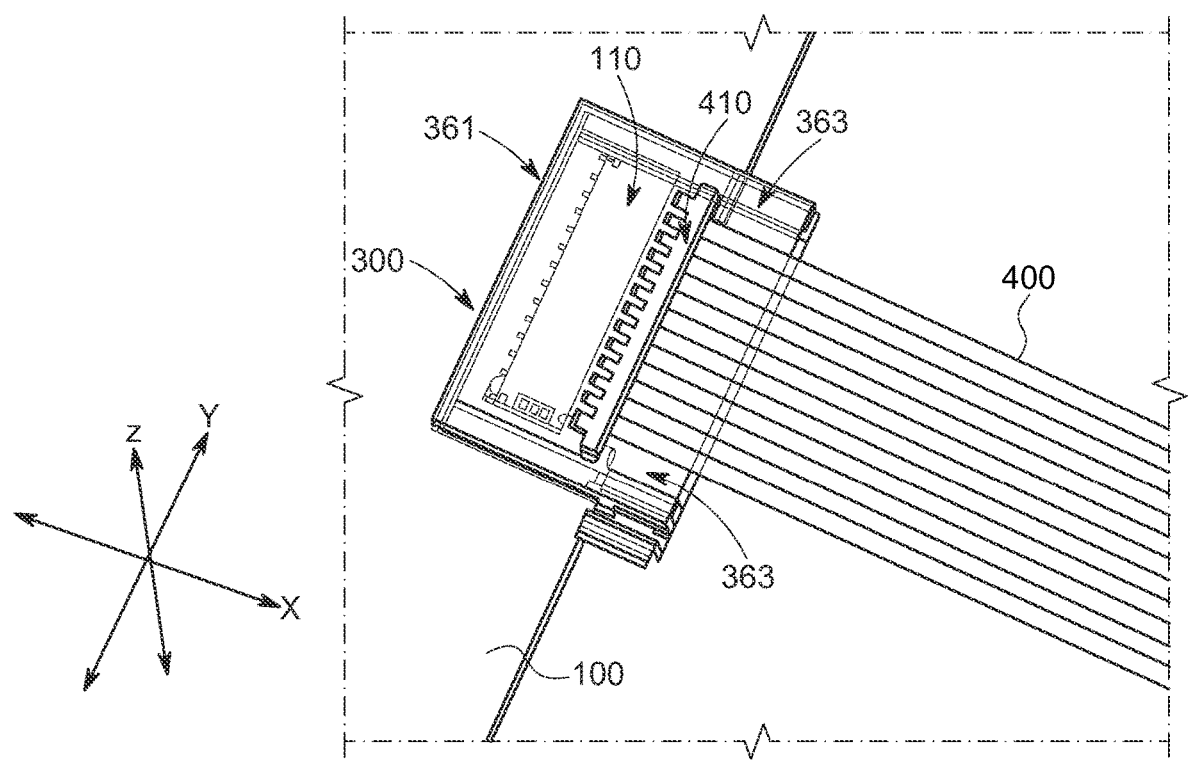
FIG. 8 is a generally perspective view of a connector clip used for another type of cable, according to certain aspects of the present disclosure.
Figure 9:
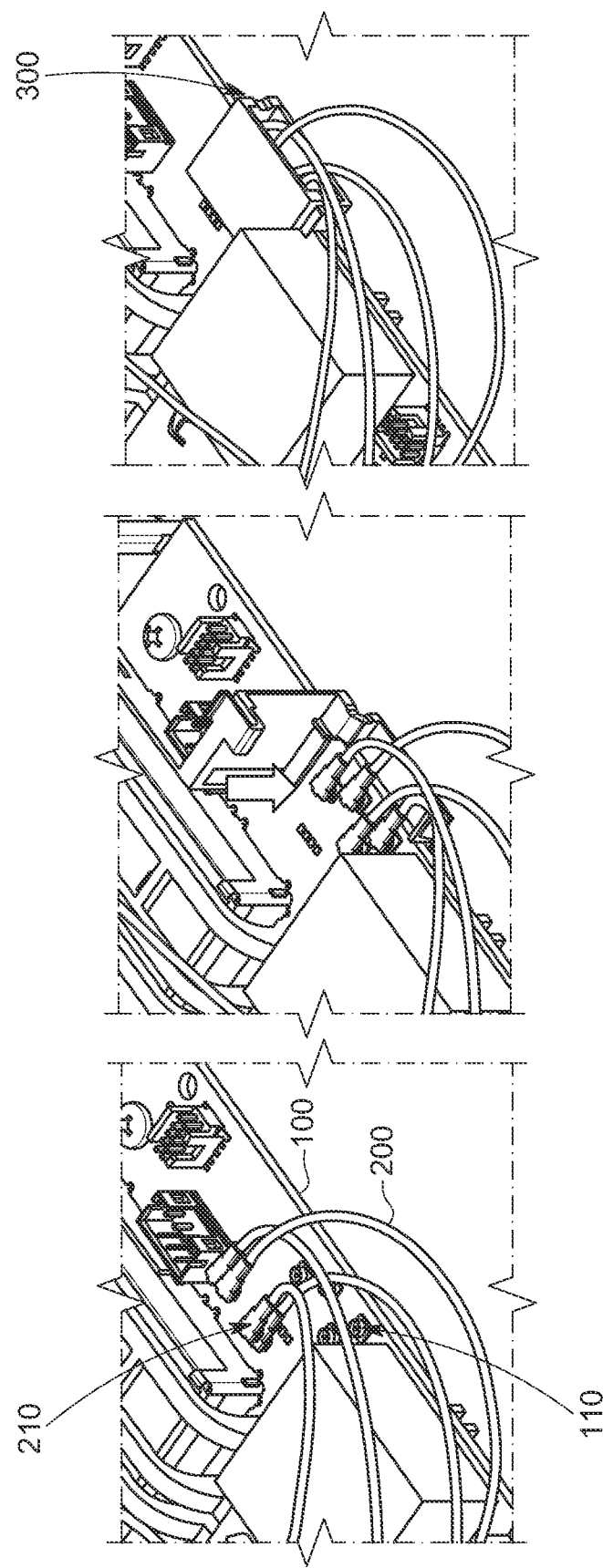
Figure 10:
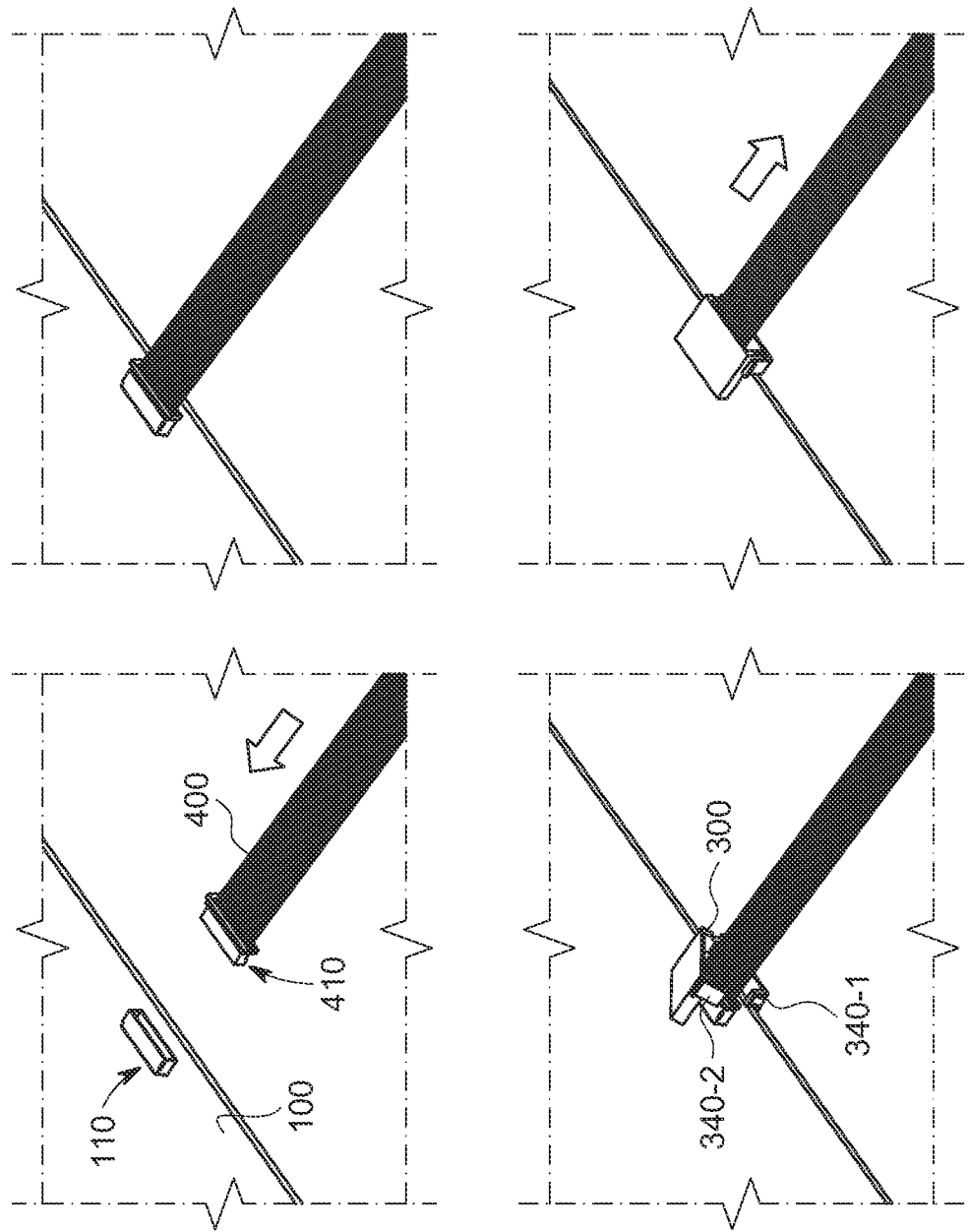

The at least one cable 200 is coupled to the at least one receptacle 110 vertically, as exemplified in FIGS. 3A-6D, 9, and 11, or horizontally, as exemplified in FIGS. 8 and 10, via the plug or connector 210 attached to a distal end of the at least one cable 200. The plug or connector 210 is shaped to mate with the corresponding at least one receptacle 110. The types of the plug or connector and the matching receptacle are not limited to ones exemplified in the drawings, and they may be coupled by different mechanisms.

Referring to FIG. 3C, the method for securing the cables 200 further includes closing the connector clip 300 by bringing the cover 320 closer to the base 310 such that connecting base side 310-3 and the connecting cover side 320-3 become parallel. The closing is performed while the at least a portion of the fastener 340 and hinge 330 is in contact with the edge of the side of the board.

Finally, referring to FIG. 3D, once the connector clip 300 is closed, the closed connector clip is fastened or locked by fastening the fastener 340 such that the connector clip is in the closed configuration. As shown in FIG. 3D, an open space is formed between the connecting base side 310-3 and connecting cover side 320-3 in the closed configuration such that the at least one cable 200 passes through the open space.

Referring to FIGS. 3A-5, when the connector clip 300 is connected to the board of the PCBA 100 via the first, second, and third open spaces formed in the closed configuration, the fastener 340 and hinge 330 are in contact with an edge of the board. It is noted that, in some embodiments, the first, second, and third open spaces form a single open space. In this state, the connector clip 300 holds at least one cable 200 passing through the internal cable opening 350 and the open space, being coupled to at least one receptacle 110 formed on the board via the plug or connector 210 formed at a distal end of the at least one cable.

Figure 4:
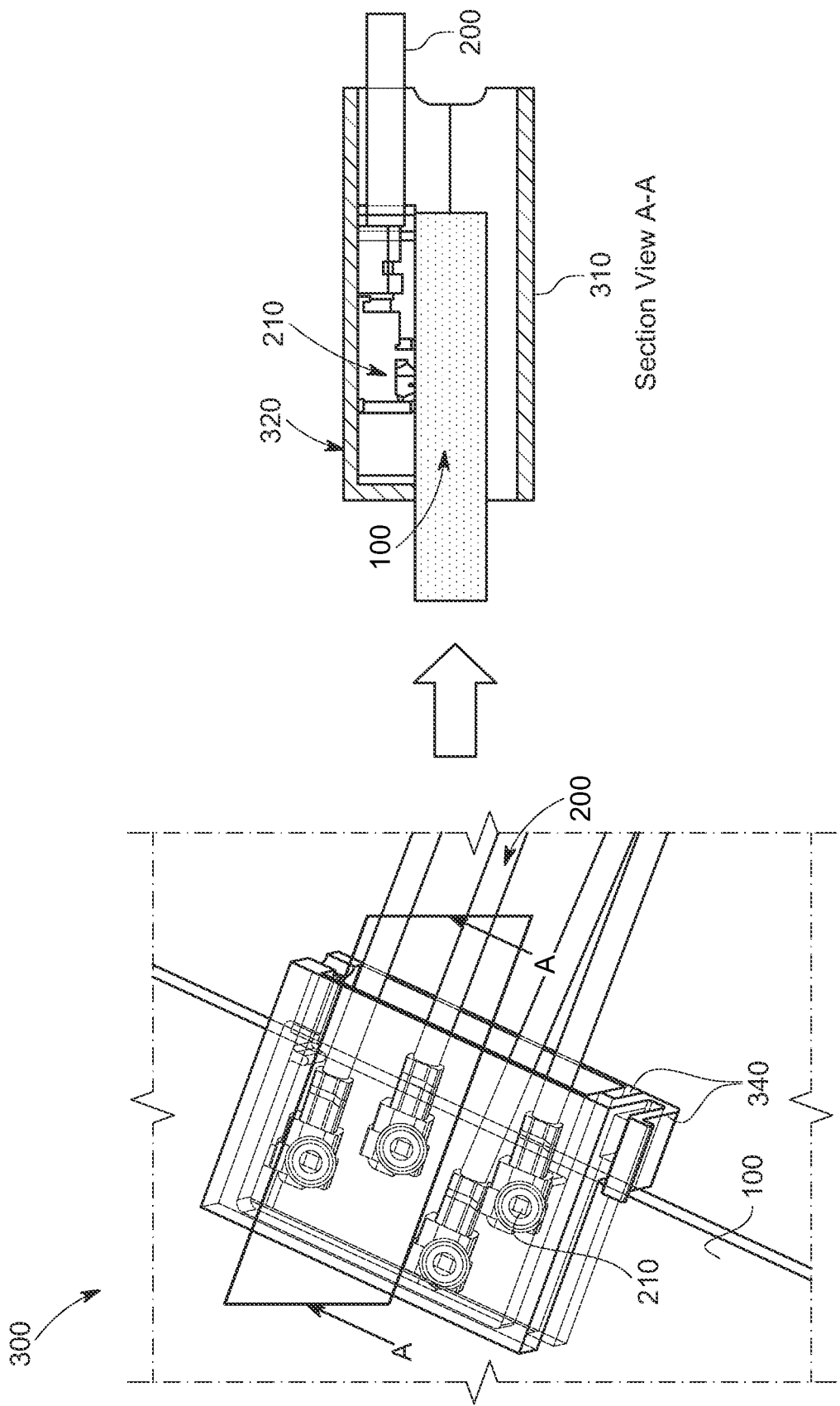
FIG. 4 shows a mechanism of how plugs of cable assemblies that are held within a connector clip coupled to a side of a PCBA are prevented from being disengaged from receptacles of the PCBA, according to certain aspects of the present disclosure.

Referring to FIG. 4, disengagement of the plug or connector 210 coupled to the at least one receptacle 110 is prevented while the connector clip 300 connected to the board is in the closed configuration. Thus, accidental disengagement can be avoided thanks to the connector clip 300 securing the cables 200 in their places on the board of the PCBA 100.

Referring to FIG. 5, the front stopper 361 is configured to constrain movement of the connector clip 300 in a first (X) direction that is parallel to the first and second sides of the connector clip. Further, the first and second side stoppers 362-1, 362-2 are configured to constrain movement of the connector clip 300 in a second direction (Y) that is perpendicular to the first direction (X). Furthermore, the cover 320 placed on top of the plug or connector 210 coupled to the at least one receptacle 110 is configured to constrain movement of the connector clip 300 in a third direction (Z) that is perpendicular to both first (X) and second (Y) directions.

In some embodiments, the fastener 340 and hinge 330 are configured to prevent disengagement of the plug or connector 210 from the at least one receptacle 110 that are coupled horizontally or in the first direction (X), as exemplified in FIGS. 8 and 10. In some embodiments, the cover 320 is further configured to prevent disengagement of the plug or connector 210 from the at least one receptacle 110 when the plug or connector and the at least one receptacle are coupled vertically or in the third direction (Z), as exemplified in FIGS. 9 and 11.

Referring to FIGS. 6A, 6B, 6C, and 6D, the plug or connector 210 can be disengaged from the at least one receptacle 110 when the connector clip 300 is in the open configuration by releasing the fastener 340. As exemplified in FIG. 6A, first, the fastener 340 is unfastened or released, and then, as exemplified in FIG. 6B, the connector clip 300 is open by raising the cover 320 away from the base 310. In this state, the connecting base side 310-3 and the connecting cover side 320-3 are no longer parallel. Once the connector clip 300 is open sufficiently, the connector clip is detached or pulled out from the board of the PCBA 100, as exemplified in FIG. 6C. Then, the cable 200 can be disconnected from the board of the PCBA 100 by uncoupling the plug or connector 210 from the corresponding receptacle 110 formed on the board, as exemplified in FIG. 6D.

Figure 7:
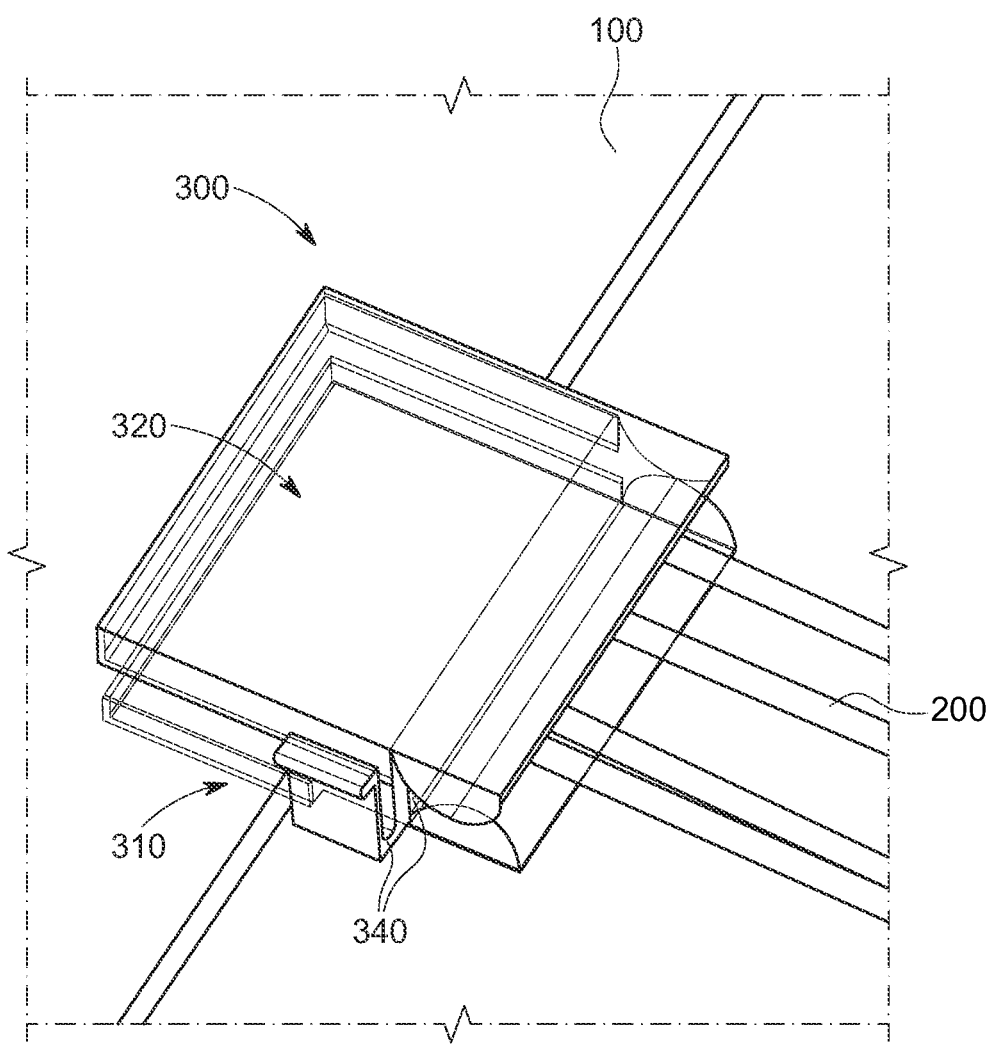
FIG. 7 is a generally perspective view of a connector clip of which outer surfaces of a cover and a base are coated with a conductive material or a thin metal layer is added to the outer surfaces, according to certain aspects of the present disclosure.

Referring to FIG. 7, in some embodiments, an outer surface of at least one of the cover 320 or the base 310 is coated with a conductive material or a thin metal is added to the outer surface to shield electromagnetic interference (EMI) around a contact point. The contact point is where the plug or connector 210 attached to a distal end of the cable 200 is coupled to the receptacle 110 formed on the board of the PCBA 100.

Referring to FIG. 8, in one embodiment, the connector clip 300 is used to hold a flat ribbon cable or multiplanar cable 400 having male and/or female connectors. The ribbon cable 400 is a flat, thin cable composed of multiple small-grade cables placed parallel to each other. With each core situated side by side, they form a wide-flat cable resembling a piece of ribbon. This type of cable is mostly used in electronic systems that require multiple data buses to link internal peripherals, such as disk drives to their respective drive controllers. In this example shown in FIG. 8, the cable 400 is coupled to the receptacle 110 horizontally or in the X direction. Movement of the connector clip 300 is constrained by the front stopper 361 and rear stopper 363.

According to an example shown in FIG. 9, a cable plug 210 is coupled to a receptacle 110 formed on a board of a PCBA 100 vertically or in the Z direction. That is, the receptacle 110 is formed such that a coupling/receiving portion of the receptacle faces upward, and the plug 210 is formed such that a coupling portion of the plug faces downward. Thus, the plug 210 is pushed down vertically to be coupled to the receptacle 110. Thereafter, the connector clip 300 connected to the board prevents the cable plug 210 from being uncoupled from the receptacle 110 because the cover 320 of the connector clip 300 is placed on top of the plug 210 coupled to the receptacle 110. In some embodiments, the cover 320 contacts the top of the plug 210 coupled to the receptacle 110. However, in some embodiments, although the cover 320 does not contact the top of the plug 210 coupled to the receptacle 110, the cover 320 is positioned sufficiently close to the top of the plug 210 to prevent the plug 210 from being uncoupled from the receptacle 110.

According to an example shown in FIG. 10, a receptacle 110 formed on a board of a PCBA 100 is configured to receive a matching cable 400 horizontally or in the X direction. That is, the receptacle 110 is formed such that a coupling/receiving portion of the receptacle 110 faces sideways, and the plug 410 is formed such that a coupling portion of the plug 410 faces sideways. Also see FIG. 8. Thus, the receptacle 110 and a cable plug 410 are coupled in the X direction, and the connector clip 300 coupled to the board of the PCBA 100 and holding the cable 400 prevents the cable plug from being uncoupled from the receptacle. In this case, at least one stopper 360 is formed at the connector clip 300 to block the plug 410. Therefore, while the connector clip 300 is in the closed configuration, it can withstand the pull-out force applied to the cable 400, thus securing the connected cable in its position. In some embodiments, at least one of the stopper 360 or the cover 320 contacts the plug 410 coupled to the receptacle 110. However, in some embodiments, although the stopper 360 or the cover 320 does not contact the plug 410 coupled to the receptacle 110 directly, the stopper 360 and/or the cover 320 is positioned sufficiently close to the plug 410 to prevent the plug 410 from being uncoupled from the receptacle 110. Although a ribbon cable is shown in FIG. 10, this applies to any type of cable.

According to an example shown in FIG. 11, a plug or connector 410 of the cable 400 is right angled with respect to the cable. Further, a receptacle 110 formed on a board of a PCBA 100 is configured to receive the matching cable 400 vertically or in the Z direction. That is, the receptacle 110 is formed such that a coupling/receiving portion of the receptacle faces upward, and the plug 410 is formed such that a coupling portion of the plug faces downward. Thus, the plug 410 is pushed down vertically to be coupled to the receptacle 110. Once the connector clip 300 is in the closed configuration, holding the cable 400, the cable plug 410 cannot be disconnected from the matching receptacle 110 because the cover 320 of the connector clip 300 is on top of the cable plug coupled to the receptacle. In some embodiments, the cover 320 contacts the top of the plug 410 coupled to the receptacle 110. However, in some embodiments, although the cover 320 does not contact the top of the plug 410 coupled to the receptacle 110, the cover 320 is positioned sufficiently close to the top of the plug 410 to prevent the plug 410 from being uncoupled from the receptacle 110. Although a ribbon cable is shown in FIG. 11, this applies to any type of cable.

While various embodiments of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

One or more elements or aspects or steps, or any portion(s) thereof, from one or more of any of claims below can be combined with one or more elements or aspects or steps, or any portion(s) thereof, from one or more of any of the other claims or combinations thereof, to form one or more additional implementations and/or claims of the present disclosure.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A connector clip comprising:
a base having a first base side joined to a second base side via a connecting base side, the first and second base sides extending from opposing ends of the connecting base side;
a cover having a first cover side joined to a second cover side via a connecting cover side, the first and second cover sides extending from opposing ends of the connecting cover side, the cover being movable relative to the base between a closed configuration and an open configuration, the cover and the base forming an internal cable opening in the closed configuration, the internal cable opening being formed in part by the connecting base side and the connecting cover side;
a hinge coupling the base and the cover, the hinge being bendable between the open and closed configurations, the connecting base side being parallel to the connecting cover side in the closed configuration, the connecting base side being non-parallel to the connecting cover side in the open configuration; and
a fastener configured to hold the first base side and the first cover side in a fixed position when the connector clip is in the closed configuration,
wherein the fastener is positioned at a first side of the connector clip formed by the first cover side and the first base side, and the hinge is positioned at a second side of the connector clip formed by the second cover side and the second base side when the connector clip is in the closed configuration such that the hinge and the fastener facing each other are parallel in the closed configuration.

2. The connector clip of claim 1, wherein an outer surface of at least one of the cover or the base is coated with a conductive material, or a thin metal is added to the outer surface to shield electromagnetic interference (EMI) around a contact point, and wherein the contact point is where a plug or connector attached to a distal end of the cable is coupled to a receptacle formed on a board of a Printed Circuit Board Assembly (PCBA).

3. The connector clip of claim 1, wherein the connector clip is produced by a single-cavity.

4. The connector clip of claim 3, wherein the connector clip is made of a plastic injection molding material.

5. The connector clip of claim 4, wherein the plastic injection molding material comprises acrylic (PMMA), acrylonitrile butadiene styrene (ABS), nylon polyamide (PA), polycarbonate (PC), polyethylene (PE), polyoxymethylene (POM), polypropylene (PP), polystyrene (PS), thermoplastic elastomer (TPE), or thermoplastic polyurethane (TPU).

6. The connector clip of claim 1, wherein the fastener comprises a latch and a hook.

7. The connector clip of claim 6, wherein:
the latch is formed at the first base side and the hook is formed at the first cover side; or
the latch is formed at the first cover side and the hook is formed at the first base side.

8. The connector clip of claim 6, wherein the latch and the hook are engaged with each other in the closed configuration, and the latch and hook are disengaged from each other in the open configuration.

9. A connector clip comprising:
a base having a first base side joined to a second base side via a connecting base side, the first and second base sides extending from opposing ends of the connecting base side;
a cover having a first cover side joined to a second cover side via a connecting cover side, the first and second cover sides extending from opposing ends of the connecting cover side, the cover being movable relative to the base between a closed configuration and an open configuration, the cover and the base forming an internal cable opening in the closed configuration, the internal cable opening being formed in part by the connecting base side and the connecting cover side;
a hinge coupling the base and the cover, the hinge being bendable between the open and closed configurations, the connecting base side being parallel to the connecting cover side in the closed configuration, the connecting base side being non-parallel to the connecting cover side in the open configuration; and
a fastener configured to hold the first base side and the first cover side in a fixed position when the connector clip is in the closed configuration, wherein:
the second cover side is coupled to the second base side via the hinge;
the first cover side and the first base side form a first side of the connector clip;
the second cover side and the second base side form a second side of the connector clip; and
the first side and second side of the connector clip are parallel.

10. The connector clip of claim 9, wherein:
a first open space is formed at the first side of the connector clip between the first base side and the first cover side in the closed configuration;
a second open space is formed at the second side of the connector clip between the second base side and the second cover side in the closed configuration; and
a height of the first open space and a height of the second open space are same.

11. The connector clip of claim 10, wherein:
a third open space is formed between a third base side of the base and a third cover side of the cover extending from an end of the connecting cover side;
the third base side and the third cover side form a third side of the connector clip;
the internal cable opening is formed at a fourth side of the connector clip being parallel to the third side of the connector clip;
the fourth side comprises a fourth base side of the base and a fourth cover side of the cover; and
the third and fourth sides of the connector clip are perpendicular to the first and second sides of the connector clip.

12. The connector clip of claim 11, wherein:
the hinge is formed at the second side of the connector clip near the fourth side of the connector clip;
the fastener is formed at the first side of the connector clip near the fourth side of the connector clip, facing the hinge;
the hinge and the fastener are located closer to the fourth side than to the third side of the connector clip; and
a width of the first open space and a width of the second open space are same.

13. The connector clip of claim 11, wherein a height of the internal cable opening is greater than a height of the third open space that is same as the heights of the first open space and second open space.

14. The connector clip of claim 11, further comprising a front stopper formed at the third cover side.

15. The connector clip of claim 14, further comprising a first side stopper formed at the first cover side and a second side stopper formed at the second cover side.

16. The connector clip of claim 15 that is in the closed configuration, wherein:
the connector clip is configured to be connected to a board of a Printed Circuit Board Assembly (PCBA) via the first, second, and third open spaces;
the fastener and hinge are in contact with an edge of the board when the connector clip is connected to the board;
the connector clip is configured to hold at least one cable passing through the internal cable opening and coupled to at least one receptacle formed on the board via a plug or connector;
the plug or connector is formed at a distal end of the at least one cable;
the front stopper is configured to constrain movement of the connector clip in a first direction that is parallel to the first and second sides of the connector clip;
the first and second side stoppers are configured to constrain movement of the connector clip in a second direction that is perpendicular to the first direction; and
the cover placed on top of the plug or connector coupled to the at least one receptacle is configured to constrain movement of the connector clip in a third direction that is perpendicular to both first and second directions.

17. The connector clip of claim 16, wherein:
the fastener and hinge are configured to prevent disengagement of the plug or connector from the at least one receptacle that are coupled horizontally or in the first direction; and/or
the cover is further configured to prevent disengagement of the plug or connector from the at least one receptacle that are coupled vertically or in the third direction.

18. A connector clip configured to be connected to a board of a Printed Circuit Board Assembly (PCBA), the connector clip comprising:
a base;
a cover coupled to the base via a bendable hinge, the cover being movable relative to the base between an open configuration and a closed configuration, the cover and the base forming an internal cable opening in the closed configuration; and
a latch configured to hold the base and the cover fixed to each in the closed configuration, the latch releasing the cover in the open configuration,
wherein a cable is inserted through the internal cable opening, the cable having a plug at a distal end, the plug being configured for engagement to the PCBA, the plug being prevented from disengagement in the closed configuration, the plug being in a condition for disengagement in the open configuration,
wherein the latch and the hinge are in contact with an edge of the board when the connector clip is connected to the board.

19. The connector clip of claim 18, wherein at least a portion of one side of the board is inserted into a space formed between the base and the cover such that the connector clip is removably connected to the board.

20. The connector clip of claim 18, wherein the internal cable opening is formed between the latch and the hinge facing each other when the connector clip is connected to the board.

* * * * *